(12) United States Patent
Wu et al.

(10) Patent No.: US 9,959,660 B2
(45) Date of Patent: May 1, 2018

(54) METHOD AND DEVICE FOR IMAGE PROCESSING

(71) Applicant: VIA ALLIANCE SEMICONDUCTOR CO., LTD., Shanghai (CN)

(72) Inventors: Fengxia Wu, Shanghai (CN); Wei Zhang, Shanghai (CN); Zhou Hong, Shanghai (CN); Yuanfeng Wang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 66 days.

(21) Appl. No.: 15/174,253

(22) Filed: Jun. 6, 2016

(65) Prior Publication Data

US 2017/0169600 A1    Jun. 15, 2017

(30) Foreign Application Priority Data

Dec. 10, 2015    (CN) .......................... 2015 1 0916333

(51) Int. Cl.
*G06T 15/00* (2011.01)
*G06T 1/60* (2006.01)
(Continued)

(52) U.S. Cl.
CPC ............. *G06T 15/005* (2013.01); *G06T 1/60* (2013.01); *G06T 15/80* (2013.01); *G06T 19/20* (2013.01);
(Continued)

(58) Field of Classification Search
CPC ..... G06T 15/005; G06T 15/405; G06T 15/40; G06T 1/60; G06T 11/40; G06T 15/503; G06T 15/80; G06T 1/20; G06T 2200/28; G06T 2210/52; G06F 12/0808; G06F 12/0875; G06F 2212/302; G06F 9/38; G06F 9/44; G06F 9/544; G09G 5/003
See application file for complete search history.

(56) References Cited

U.S. PATENT DOCUMENTS 6,407,736 B1 * 6/2002 Regan ................... G06T 15/005
                                                        345/422
6,636,214 B1 * 10/2003 Leather ................. G06T 15/005
                                                        345/421
(Continued)

OTHER PUBLICATIONS

Greene, Ned. "Hierarchical polygon tiling with coverage masks." Proceedings of the 23rd annual conference on Computer graphics and interactive techniques. Acm, 1996.*

*Primary Examiner* — Sultana M Zalalee
(74) *Attorney, Agent, or Firm* — Huffman Law Group, PC (57) ABSTRACT

A device for image processing includes a first queue, a second queue, a cache, and a processor. The first queue is capable of receiving a first image tile. The processor is electrically connected to the first queue, the second queue, and the cache, respectively. The processor is capable of obtaining the first image tile from the first queue and obtaining mask information of the background mask corresponding to the first tile from the cache. The processor determines the relationship between the first image tile and the background mask based on the first image tile and the mask information so as to selectively transfer the first image tile to the second queue.

12 Claims, 6 Drawing Sheets

(51) Int. Cl.
*G06T 15/80* (2011.01)
*G06T 19/20* (2011.01)
(52) U.S. Cl.
CPC ...... *G06T 2200/04* (2013.01); *G06T 2200/28* (2013.01)

(56) References Cited

U.S. PATENT DOCUMENTS

| | | | | |
|---|---|---|---|---|
| 6,636,215 | B1* | 10/2003 | Greene | G06T 15/405 |
| | | | | 345/422 |
| 6,646,639 | B1* | 11/2003 | Greene | G06T 15/005 |
| | | | | 345/422 |
| 6,734,861 | B1* | 5/2004 | Van Dyke | G06T 15/005 |
| | | | | 345/506 |
| 6,999,100 | B1* | 2/2006 | Leather | G06T 11/40 |
| | | | | 345/611 |
| 7,450,120 | B1* | 11/2008 | Hakura | G06T 15/005 |
| | | | | 345/421 |
| 8,854,364 | B1* | 10/2014 | Voorhies | G06T 15/40 |
| | | | | 345/419 |
| 2003/0056020 | A1* | 3/2003 | Chaudhry | G06F 9/544 |
| | | | | 719/313 |
| 2006/0209065 | A1* | 9/2006 | Lapidous | G06T 15/40 |
| | | | | 345/422 |
| 2011/0043518 | A1* | 2/2011 | Von Borries | G06T 11/40 |
| | | | | 345/419 |
| 2014/0118347 | A1* | 5/2014 | Hakura | G06T 15/005 |
| | | | | 345/422 |
| 2015/0109293 | A1* | 4/2015 | Wang | G06T 15/405 |
| | | | | 345/422 |

* cited by examiner

METHOD AND DEVICE FOR IMAGE PROCESSING

CROSS REFERENCE

The present application is based on, and claims priority from, China Application Serial Number 201510916333.3, filed on Dec. 10, 2015, the disclosure of which is hereby incorporated by reference herein in its entirety.

TECHNICAL FIELD

This disclosure is related to a method and a device for image processing, and particularly related to a method and a device for image processing which reduces the complexity of computation.

BACKGROUND

In the field of image displaying, there is a stereo image display technique. The displayed image varies with the variation of the angle of view and/or the distance of the object in the image so as to provide a sense of view meeting the sensory experience. Usually, a surface of an object in such image is consisting of a plurality of image tiles. When the image is displayed, each of the image tiles is processed with the shading process. However, the more the objects, the more the image tiles, and the more the computation of shading therefore. This is usually the bottleneck of the image processing engine and limiting the frame rate provided by the image processing engine.

SUMMARY

A method for image processing in one embodiment of this disclosure includes the steps of: obtaining a first image tile, obtaining mask information of a background mask corresponding to the first image tile from a cache, and selectively transferring the first image tile to a processing queue based on a relationship between the first image tile and the background mask.

An image processing device in one embodiment of this disclosure includes a first queue, a second queue, a cache, and a processor. The first queue is capable of receiving a first image tile. The processor is electrically connected to the first queue, the second queue, and the cache, respectively. The processor is capable of obtaining the first image tile from the first queue, and obtaining mask information of a background mask corresponding to the first image tile from the cache. The processor determines a relationship between the first image tile and the background mask based on the first image tile and the mask information so as to selectively transfer the first image tile to the second queue.

In order to make the aforementioned and other features of the present disclosure more comprehensible, several embodiments accompanied with figures are described in detail below.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
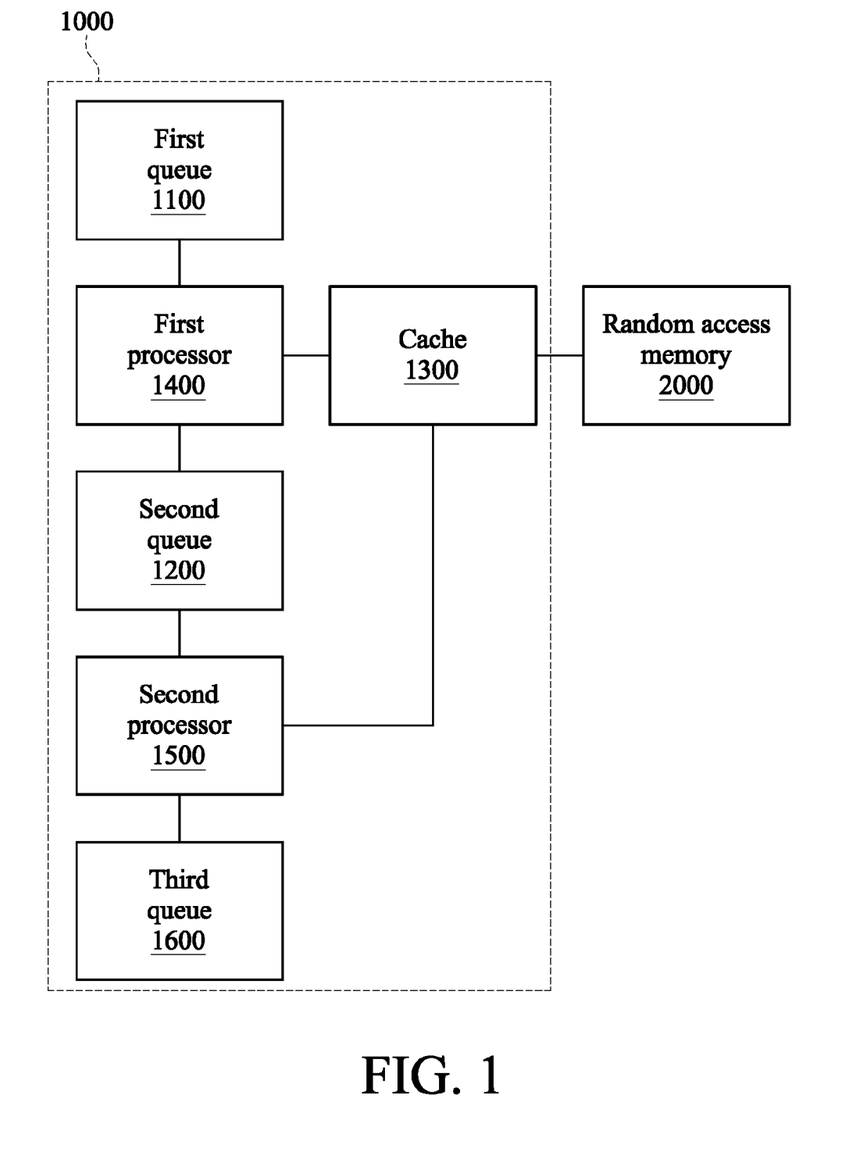
FIG. 1 is a functional block diagram of the image processing device according to one embodiment of this disclosure.
Figure 2:
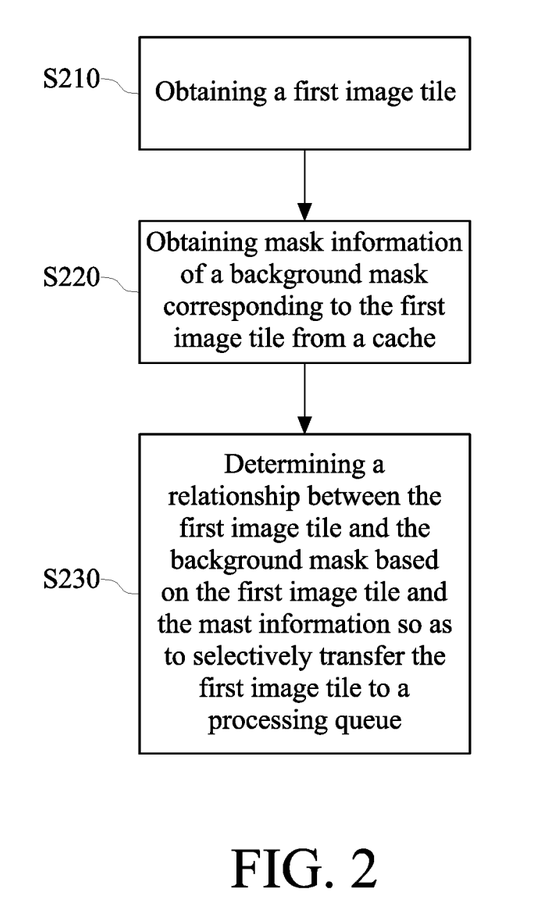
FIG. 2 is a flowchart of the method for image processing according to one embodiment of this disclosure.

Please refer to FIG. 1 and FIG. 2, wherein FIG. 1 is a functional block diagram of the image processing device according to one embodiment of this disclosure, and FIG. 2 is a flowchart of the method for image processing according to one embodiment of this disclosure. As shown in FIG. 1, the image processing device 1000 in one embodiment of this disclosure includes the first queue 1100, the second queue 1200, the cache 1300, the first processor 1400, the second processor 1500, and the third queue 1600. The first processor 1400 is electrically connected or coupled to the first queue 1100, the second queue 1200, and the cache 1300, respectively. The first queue 1100 is capable of receiving and temporarily storing the first image tile to be processed. The cache 1300 is capable of keeping data of the background mask previously processed. The second processor 1500 is electrically connected to the second queue 1200, the cache 1300, and the third queue 1600, respectively. The cache 1300 is further electrically connected to a random access memory 2000 (hereinafter as RAM 2000), wherein data of most or all background masks is stored in the RAM 2000. The data received and temporarily stored in the first queue 1100 are raster image data.

As shown in the flowchart of FIG. 2, in step S210, the first processor 1400 obtains the first image tile from the first queue 1100. In step S220, the first processor 1400 obtains mask information of the background mask corresponding to the first tile from the cache 1300. In step S230, the first processor 1400 determines the relationship between the first image tile and the background mask based on the first image tile and the mask information so as to selectively transfer the first image tile to the second queue.

Figure 3:
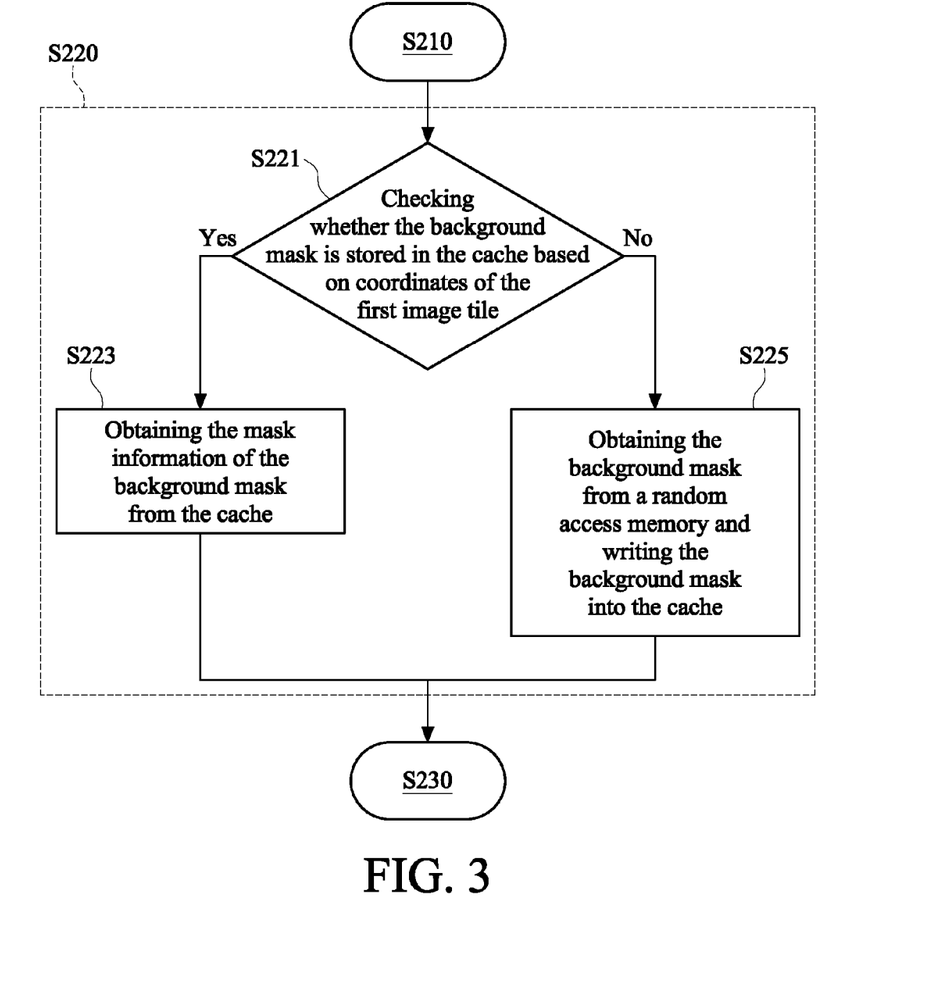
FIG. 3 is a flowchart of the step S220 according to one embodiment of this disclosure.
Figure 4:
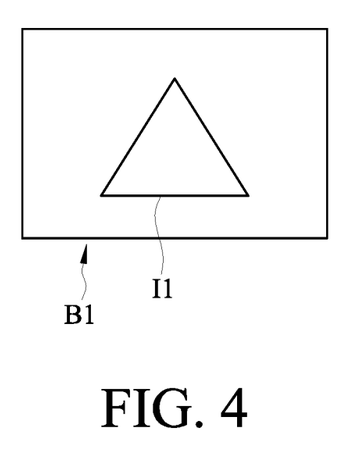
FIG. 4 illustrates the first image tile according to one embodiment of this disclosure.

In step S220, the first processor 1400 has already had the data of the first image tile. Specifically, please refer to FIG. 3 and FIG. 4, wherein FIG. 3 is a flowchart of the step S220 according to one embodiment of this disclosure, and FIG. 4 illustrates the first image tile according to one embodiment of this disclosure. The data of the block B1, including the first image tile I1, in FIG. 4 includes the coordinates, x values and y values, of the block B1, the depth, z values, of the block B1, and the mask flag of the block B1. If a pixel in the block B1 belongs to the first image tile I1, the mask flag of that pixel is set to be 1. Otherwise, the mask flag of that pixel is set to be 0. In step S221, the first processor 1400 checks whether the background mask in the cache 1300 is corresponding to the block B1. For example, the block B1 includes 8*8 pixels therein, and the first processor 1400 checks whether the first piece of data and the last piece of data of one background mask in the cache 1300 are corresponding to the pixel (0,0) and the pixel (7,7) of the block B1. If the aforementioned pieces of data are corresponding to the aforementioned pixels, it means that the pieces of data of the depth range of the background mask are corresponding to the block B1. Hence, as shown in step 223, the processor obtains the background mask information in the cache 1300. Otherwise, the cache 1300 does not have the background mask information corresponding to the block B1, so as shown in step S225, the first processor 1400 obtains the mask information of a background mask corresponding to the block B1 from the RAM 2000 via the cache 1300 and calculates the depth range of the block B1. In one embodiment, the mask information includes the depth value of the background tile in the background mask. Meanwhile, the depth range data of the background mask obtained from the RAM 2000 is kept in the cache 1300 or the first processor 1400. After the step S223 or the step S225, the flow goes to the step S230.

Figure 5:
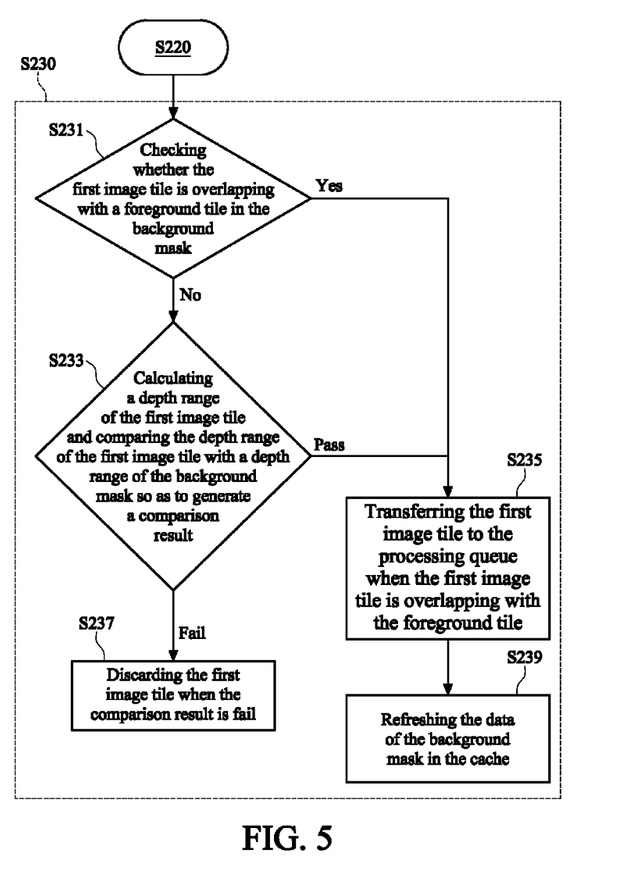
FIG. 5 is a flowchart of the step S230 according to one embodiment of this disclosure.
Figure 6:
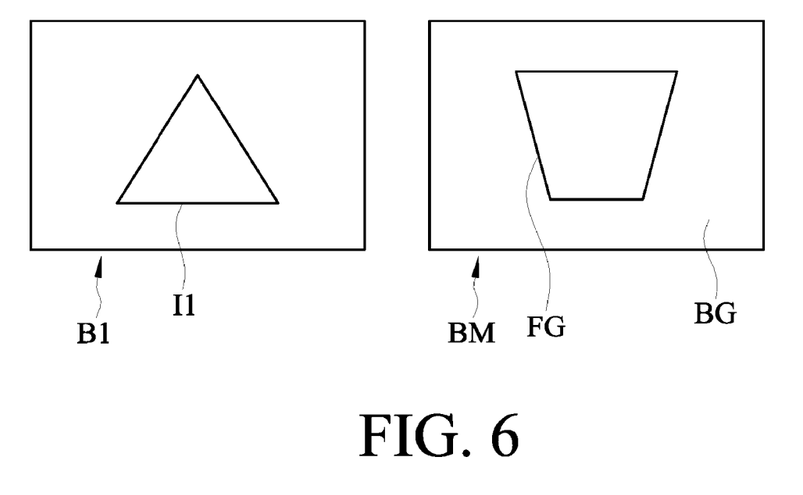
FIG. 6 illustrates the first image tile and the background mask according to one embodiment of this disclosure.

In step S230, please refer to FIG. 5 and FIG. 6, wherein FIG. 5 is the flowchart of the step S230 according to one embodiment of this disclosure, and FIG. 6 illustrates the first image tile and the background mask according to one embodiment of this disclosure. The background mask BM is divided into the background block BG and the foreground tile FG. In step S231, the first processor 1400 determines whether the first image tile I1 is overlapping with the foreground tile FG. In this embodiment, the mask flag assigned to the background block BG is zero and the mask flag assigned to the foreground tile FG is one. Similarly, the first image tile I1 in the block B1 is assigned with the mask flag of one while other portion of the block B1 is assigned with the mask flag of zero. The first processor 1400 performs the bit-wise AND operation over the block B1 and the background mask BM. That is, the mask flag of one pixel of the block B1 is performed with the AND operation with the mask flag of the corresponding pixel of the background mask BM.

When at least one of the operation results is one, it means that the first image tile I1 is overlapping with the foreground tile FG, and the relationship there between should be calculated so the first image tile I1 cannot be discarded. Hence, as shown in step S235, the block B1 including the first image tile I1 is transferred to the second queue 1200 by the first processor 1400. In one embodiment, the coordinates data of the first image tile I1 is written into the background mask BM. In another embodiment, the block B1 and the background BM are operated with the bit-wise OR operation so as to obtain a new foreground tile FG and a new back block BG. Then, as shown in step S239, the first processor 1400 refresh the data of the background mask in the cache 1300 accordingly.

In one embodiment, the first processor 1400 includes a plurality of AND gates and the amount of the AND gates equals to the amount of the pixels of the block B1 stored in the first queue 1100. Taking the aforementioned embodiment for example, the first processor 1400 includes 64 AND gates. Additionally, the first processor 1400 may further have an OR gate electrically connected to the 64 AND gates so that if at least one output of the AND gates is one, the output of the OR gate is one, and it means the first image tile I1 is overlapping for at least one pixel with the foreground tile FG. Otherwise, if the output of the OR gate is zero, it means that the first image tile I1 is totally in the area of the background block BG. With this architecture, the aforementioned determination may be complete within one cycle of the clock signal. Furthermore, according to the architecture of the cache of the mainstream, the amount of the AND gate is usually equal to 4*4, 4*8, 8*4, 8*8, or $2^N*2^M$, wherein N and M are positive integers.

If the operation result is zero for all bits (all pixels), it means that the first image tile I1 is not overlapping for any pixel with the foreground tile FG. Hence, the first processor 1400 performs further computation so as to determine whether the block B1 including the first image tile I1 can be discarded or not. First in step S233, the first processor 1400 calculates the depth range DR1 of the first image tile I1, and compares the depth range DR1 of the first image tile I1 with the depth range DRB of the background block BG of the background mask BM.

When the first processor 1400 calculates the depth range DR1, the first processor 1400 only has to calculate the depth value (z value) of each of the end points of the first image tile I1 to obtain the depth range DR1 because the image tile can be seen as a triangle plain surface or a polygon plain surface in space. The depth range DR1 can be defined as:

$$DR1=(\max(S\{dp1,\ldots,dpn\}),\min(S\{dp1,\ldots,dpn\}))$$

$S\{dp1,\ldots,dpn\}$ is the set of the axis aligned to the plurality of depth corresponding to the plurality of end points of the first image tile.

When the depth range DR1 of the first image tile I1 is obtained, the first processor 1400 compares the depth range DR1 with the depth range DRB of the background block BG of the background mask BM so as to determine whether the first image tile I1 belongs to the background block BG or not and whether the first image tile I1 needs to be processed.

As to the step of the depth comparison, also called as the depth test, for example, when the mode of the depth comparison defines as "less", and the depth range DR1 is larger than the depth range DRB, the comparison result is fail, and it means that the first image tile I1 needn't to be processed in the successive procedure. In the comparison mode, if at least a portion of the depth range DR1 is less than the depth range DRB, the comparison result of the depth comparison is pass and it means that the first image tile has to be processed in the successive procedure.

If it is determined that the first image tile I1 needs to be processed, the flow goes to step S235 that the processor transfers the block B1 including the first image tile I1 to the second queue 1200. Otherwise, it means that the first image tile I1 can be discarded and as shown in step S237, the first processor 1400 discards the block B1 including the first image tile I1. In one embodiment, when the first image tile I1 is transferred to the second queue 1200, the first processor 1400 refreshes the background mask.

In one embodiment, the first processor 1400 refreshes the information of the background mask BM to the cache 1300. Every time when the first processor 1400 determines the background mask in the cache 1300 is not corresponding to the currently processed image tile, the first processor 1400 obtains new background mask from the RAM 2000 via the cache 1300, and the depth values corresponding to the background mask in the cache 1300 are flushed out automatically. When there is a new image tile is corresponding to this background mask, the cache is capable of calculating new depth range of this background mask automatically. Hence, the data of the background masks in the RAM 2000 is also refreshed repeatedly. The image tile transferred to the second queue 1200 is transferred by the second processor 1500 to a downstream module for pixel shading. After a piece of data is processed with pixel shading, the piece of data is transferred to the third queue 1600 by the second processor 1500.

With the device and method for image processing in the embodiments of this disclosure, some of the image tiles are discarded before shading, so the amount of the image tiles to be shaded is reduced and so is the complexity of computation. Hence, the efficiency of image processing is improved.

What is claimed is:

1. A method for image processing, comprising:
    obtaining a first image tile;
    obtaining mask information of a background mask corresponding to the first image tile from a cache; and
    determining a relationship between the first image tile and the background mask based on the first image tile and the mask information so as to selectively transfer the first image tile to a processing queue;
        wherein the step of determining the relationship between the first image tile and the background mask based on the first image tile and the mask information so as to selectively transfer the first image tile to the processing queue comprises:
    checking whether the first image tile is overlapping with a foreground tile in the background mask;
    transferring the first image tile to the processing queue when the first image tile is overlapping with the foreground tile; and
    selectively transferring the first image tile to the processing queue based on a relationship of depth between the first image tile and the background mask when the first image tile is not overlapping with the foreground tile.

2. The method in claim 1, further comprising refreshing the background mask to the cache or storing the background mask in a first processor.

3. The method of claim 1, wherein the step of obtaining the mask information of the background mask comprises:
    checking whether the background mask is stored in the cache based on coordinates of the first image tile;
    obtaining the mask information of the background mask from the cache when the background mask is stored in the cache; and
    obtaining the background mask from a random access memory and writing the background mask into the cache when the background mask is not stored in the cache.

4. The method in claim 3, further comprising writing data in the cache into the random access memory before the step of writing the background mask into the cache.

5. The method in claim 1, wherein the step of selectively transferring the first image tile to the processing queue based on a relationship of depth between the first image tile and the background mask when the first image tile is not overlapping with the foreground tile comprises:
    calculating a depth range of the first image tile;
    comparing the depth range of the first image tile with a depth range of the background mask so as to generate a comparison result;
    transferring the first image tile to the processing queue when the comparison result is pass; and
    discarding the first image tile when the comparison result is fail.

6. The method in claim 5, wherein the step of calculating the depth range of the first image tile comprises:

calculating a plurality of depth corresponding to a plurality of end points of the first image tile so as to obtain a plurality of depth values; and
    determining the depth range of the first image tile based on a maximum of the plurality of depth values and a minimum of the plurality of depth values.

7. An image processing device, comprising:
    a first queue capable of receiving a first image tile;
    a second queue;
    a cache; and
    a processor electrically connected to the first queue, the second queue, and the cache, and capable of obtaining the first image tile from the first queue, obtaining mask information of a background mask corresponding to the first image tile from the cache, and determining a relationship between the first image tile and the background mask based on the first image tile and the mask information so as to selectively transfer the first image tile to the second queue;
    wherein when the processor selectively transfer the first image tile to the second queue, the processor checks whether the first image tile is overlapping with a foreground tile in the background mask, and the processor transfers the first image tile to the second queue when the first image tile is overlapping with the foreground tile, and the processor selectively transfer the first image tile to the second queue based on a relationship of depth between the first image tile and the background mask when the first image tile is not overlapping with the foreground tile.

8. The image processing device in claim 7, wherein the processor further refresh the background mask into the cache.

9. The image processing device of claim 7, wherein the processor checks whether the background mask is in the cache based on coordinates of the first image tile, and the processor obtains the background mask from the cache when the background mask is in the cache, and the processor obtains the background mask from a random access memory and write the background mask into the cache when the background mask is not in the cache.

10. The image processing device in claim 9, wherein the processor further writes data in the cache into the random access memory before write the background mask into the cache.

11. The image processing device in claim 7, wherein when the first image tile is not overlapping with the foreground tile, the processor calculates a depth range of the first image tile and compares the depth range of the first image tile with a depth range of the background mask so as to generate a comparison result, and the processor transfers the first image tile to the second queue when the comparison result is pass, and the processor discards the first image tile when the comparison result is fail.

12. The image processing device of claim 11, wherein when the processor calculates the depth range of the first image tile, the processor calculates a plurality of depth corresponding to a plurality of end points of the first image tile so as to obtain a plurality of depth values and determines the depth range of the first image tile based on based on a maximum of the plurality of depth values and a minimum of the plurality of depth values.

* * * * *